Aug. 22, 1933.   E. A. LARSSON   1,923,314
TROLLEY TENDER
Filed Nov. 7, 1931   2 Sheets-Sheet 1

Inventor
ERNST A. LARSSON
By
Attorney

Aug. 22, 1933.   E. A. LARSSON   1,923,314
TROLLEY TENDER
Filed Nov. 7, 1931   2 Sheets-Sheet 2

Inventor
ERNST A. LARSSON
By
Attorney

Patented Aug. 22, 1933

1,923,314

UNITED STATES PATENT OFFICE 1,923,314

TROLLEY TENDER

Ernst A. Larsson, Mansfield, Ohio, assignor to The Ohio Brass Company, Mansfield, Ohio, a Corporation of New Jersey Application November 7, 1931. Serial No. 573,637

16 Claims. (Cl. 191—91)

My invention relates to trolley tenders of the combined catcher and retriever types.

One object of my invention is to provide a device which is capable of maintaining the trolley rope slightly taut, to restrain the trolley pole from rising to a dangerous height when the current collector leaves the wire and to quickly retrieve the trolley pole below the overhead structure by drawing in the rope.

Another object of my invention is to provide means whereby the retrieving mechanism may be reset without the necessity of an operator pulling out the rope from the retriever as a continuous operation constantly against the tension of the retrieving spring.

Other objects and advantages of my invention will disclose themselves as I proceed with a description of my invention.

My invention resides in the new and novel construction, combination and relation of the various parts hereinafter described and shown in the drawings accompanying this specification.

In the drawings:—

Fig. 3 is a front view of Fig. 1 with certain parts dotted in.

Figure 3:
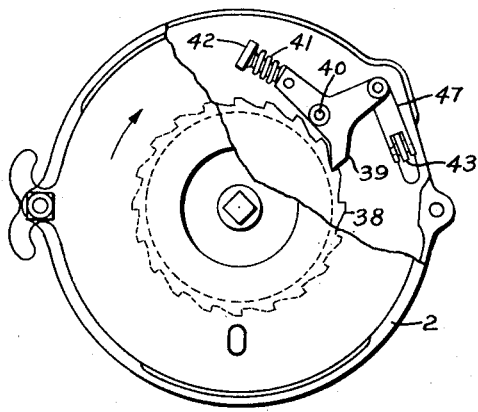
Figure 1:
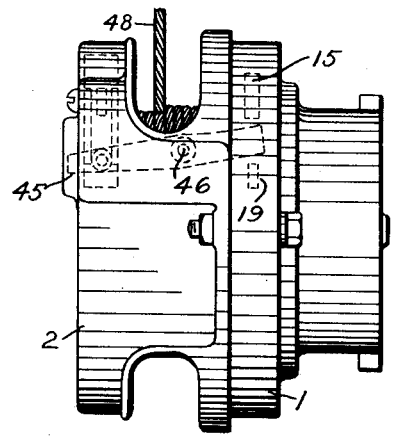
Fig. 1 is a side view of my invention complete.
Figure 2:
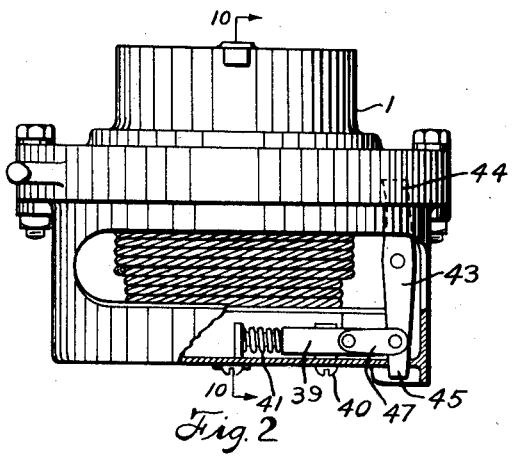
Fig. 2 is a top view of Fig. 1.

In the preferred embodiment of my invention I provide a casing having a back portion 1 and a front portion 2 held by bolts, the latter being removable. The back portion is provided with lugs 3 arranged to fit a holder which in turn is secured to a car.

Fixedly secured to the back wall of the case 1 is a spindle 4 having a reduced portion 5 at the forward end.

Mounted within the case 1 is the retrieving spring 6 having one end secured to the side wall of the casing by means of rivets 7 and secured to a collar or sleeve 8 by means of rivets 9. The sleeve 8 has a square or irregular-shaped passage therethrough to receive the end of the shaft 10 which is squared to fit the passage in the sleeve 8 so that the members 8 and 10 will rotate together. As later described the drum upon which the rope is wound is, under certain conditions, interconnected with the spring 6 such that when the rope under normal operation is withdrawn from the device the tension in the spring 6 will be increased.

Figure 6:
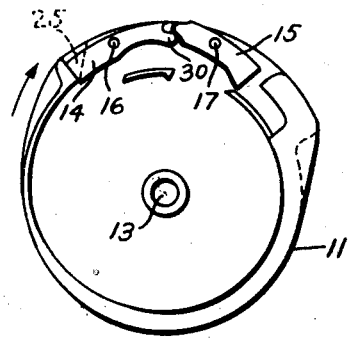
Fig. 6 is a front face view of the retrieving disc with its dogs shown in position for retrieving.
Figure 7:
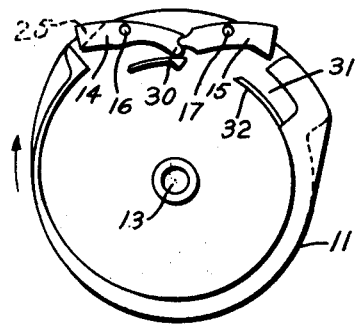
Fig. 7 is a front face view of the retrieving disc with the dogs shown in the locked position preventing rotation of the disc.
Figure 8:
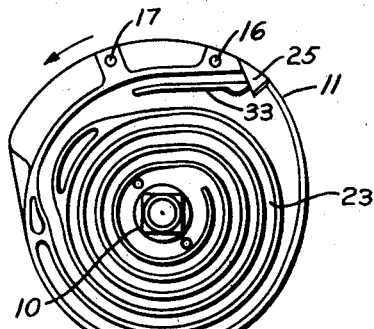
Fig. 8 is a rear face view of the retrieving disc showing the control groove.

Mounted upon the central portion of the shaft 4 is a retrieving disc 11 shown also in Figs. 6, 7 and 8. The disc has a shaft 10 projecting rearwardly as already explained and the shaft 12 projecting forwardly and having the passage 13 to receive the shaft 4 upon which the disc is free to rotate. The disc is provided with two dogs 14 and 15 pivotally mounted at 16 and 17 and interlocked at their adjacent ends to move in unison.

When the dogs 14 and 15 are in the position shown in Fig. 7 they will engage respectively with the stop lugs 18 and 19 integrally secured to the casing 1 and in which position the dog 14 will be held against the stop lug 18 by the tension in the retrieving spring 6 which is exerting effort to rotate the disc 11 and in turn rotate the rope reel to wind up the rope.

Figure 9:
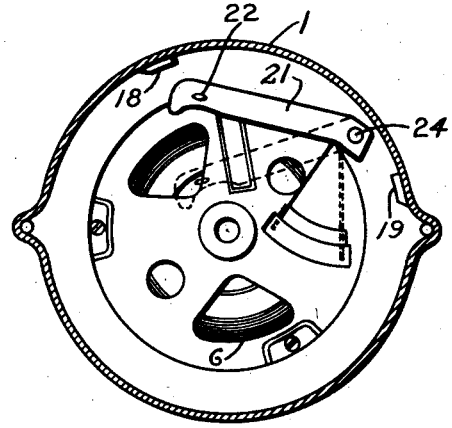
Fig. 9 is a sectional view in full on the line 9—9 of Fig. 10.
Figure 10:
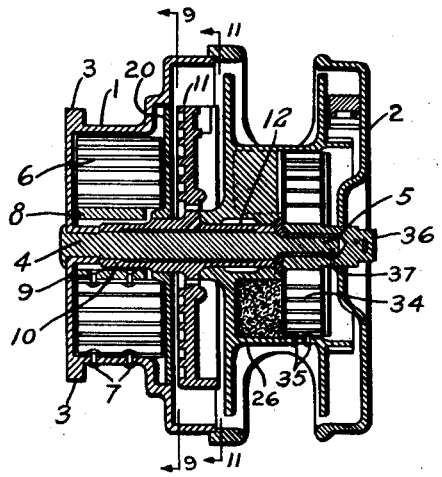
Fig. 10 is a sectional view on the line 10—10 of Fig. 2.
Figure 11:
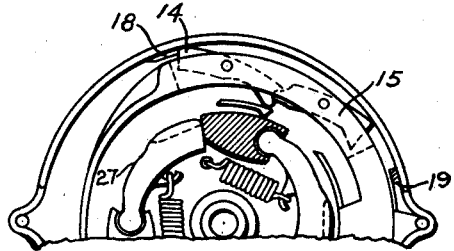
Fig. 11 is a sectional view on the line 11—11 of Fig. 10 showing the retrieving disc in its set or locked position and the reel free to function.

Pivotally mounted upon the diaphragm 20 is an arm 21 which moves between the limits indicated by the full lines and the dotted lines in Fig. 9 and is provided with a projecting lug 22 which is positioned in the groove 23 and, therefore, the arm 21 moves between its limits upon its pivot 24 as the disc 11 rotates in one direction or the other.

When the disc 11 rotates in the direction indicated by the arrow in Figs. 6 and 8 and with the dogs 14 and 15 shown as in Fig. 6 the arm 21 will move from its inner position to its outer or full line position shown in Fig. 9 and the member 22 will engage with the projection 25 on the dog 14 and force that end of the dog 14 upwardly which in turn operates the dog 15 and the two will take the position shown in Fig. 7. Continued rotation of the disc 11 will engage the end of the dog 15 with the stop 19 on the case except as hereinafter described thus arresting further rotation of the disc 11. If the disc 11 is now released the same will rotate in the opposite direction until the dog 14 engages with the stop 18 on the casing thus holding the disc against further re-rotation but biased to further re-rotation under action of the spring 6.

The rope reel 26 is provided on its rear face with centrifugally operated dogs 27 normally held inwardly by springs 28 with the face of the dog against the stop 29. When the reel is rotated rapidly in a rope-unwinding direction the centrifugal dogs will be thrown outwardly and one will engage with the lower end 30 of the stop dog 14 thus raising the end 30 and also the co-acting end of the dog 15 moving the dogs to the position shown in Fig. 6. During the just described actions the free end of the centrifugal dog will pass quickly into the pocket 31, a portion of the dog riding upon the projecting flange 32 and this action will take place before the free end of the dog 15 has been moved to the position shown in Fig. 6 thus locking the centrifugal dog with the disc 11 which in turn locks the rope reel and disc 11 so that they will rotate in unison.

The free end of the dog 14 now being released from the stop 18 and the disc 11 being under action of the spring 6, the disc 11 will be rotated and with it the reel in a rope-winding direction. It will be apparent that the reel and disc will be held in locked relation as long as the centrifugal dog 27 rests in the pocket 31 and the holding dogs 14 and 15 are in the position shown in Fig. 6.

It will also be apparent from previous description of the operation that when the disc 11 rotates under action of the spring 6 that the free end of the lever 21 will be moved inwardly due to the spiral groove. If the reel is now rotated as by withdrawing the rope therefrom the disc 11 will also rotate in the direction of the arrow in Fig. 6 and while this rotation takes place the spring 6 will be wound up and the free end of the lever 21 moved outwardly until the member 22 engages with the projection 25 on the free end of the holding dog 14 thus moving both dogs 14 and 15 to their locking position to engage with the lugs 18 and 19. As the lug 22 passes beyond the end of the flange 33 it will drop downwardly and out of reengaging position with the lug 14.

It will be noted that the reel 26 under normal operation is free to rotate upon the projecting portion 12 of the disc 11. The reel is hollow and mounted within the reel is a rope tension spring 34 which has one end secured to the reel by means of the rivets 35 and the other end secured to the member 36 which in turn is secured to the shaft 4 against rotation or longitudinal movement by means of the removable pin 37. The spring 34 is merely of sufficient tension to take up the normal slack in the rope without retarding the rotation of the reel in a rope-unwinding direction.

It will be recognized that if after a retrieving action by the device it is desired to unwind the rope and reset the device that from the description thus far given it will be necessary for the operator to exert a continuous pull upon the rope to unwind it from the reel and against the continually increasing tension in the spring 6 and, therefore, I provide further means which permits the operator to release his hold upon the rope after each separate pull but requiring him to complete the withdrawal of the rope before the device is completely set and in operable condition.

The holding means comprises a plurality of teeth 38 which may be termed a ratchet integrally secured to the face of the reel 26 and a dog 39 pivotally mounted on the screw 40 to engage and disengage the teeth 38. The dog is held in the engaging or released position by the over-the-center spring 41 interposed between the dog 39 and a fixed lug 42. The dog 39 may be pivotally mounted on the interior front face of the casing 2 by means of the screw 40.

Figure 12:
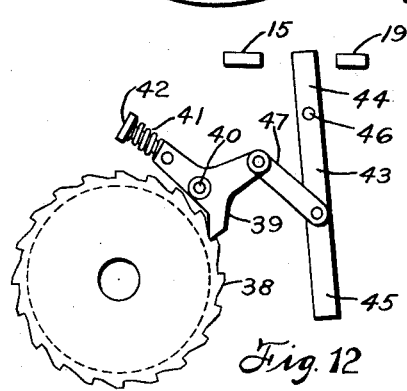
Fig. 12 is a schematic view of the rewind holding mechanism.

Pivotally mounted upon the front casing 2 is a lever 43 having its rear end 44 projecting into the path of the holding dog 15 when such dog is in its holding position as shown in Fig. 7. The forward end 45 of the lever 43 projects outside the casing 2 such that it may be moved at will of an operator in order to throw the dog 39 into or out of engagement with the teeth 38. The lever 43 is pivoted to the case by a rivet at 46 and is pivotally connected to the dog 39 by the link 47. In Fig. 12 the aforesaid described arrangement is shown schematically.

The operation of the holding mechanism is as follows.

Assuming the retriever has been operating normally and has been tripped due to the current collector leaving the trolley wire, the centrifugal dogs will have been thrown outwardly as the rope unwound and rotated the drum and the spring 6 will have retracted the rope by rotating the disc and drum and the holding dogs 14 and 15 will have been moved to the position shown in Fig. 6 instantly upon the centrifugal dogs first acting. The device is now in a condition for resetting.

The dog 39 is now out of engagement with the teeth 38 on the drum and the operator will move the end 45 of the lever 43 so as to throw the dog 39 into engagement with the teeth 38. The operator may now grasp the rope 48 and withdraw it from the device thus rotating the reel and disc and winding up the spring 6 and the direction of rotation of the reel will be that shown by the arrow on Fig. 3. The operator may release his rope after each pull and it will be seen that the drum will be held against counter revolution by the spring 6 through engagement of the teeth 38 and the dog 39. As many intermittent pulls may be applied as necessary to bring the device to a normally set condition and when the device has been brought to that condition, as previously explained, the holdings dogs 14 and 15 will be thrown outwardly and into the position shown in Fig. 7 through the action upon these dogs of the lug 22 on the lever 21. This brings the free end of the dog 15 into position to engage the inner end 44 of the lever 43 as the rope is further unwound.

It was previously stated that the dog 15 would engage the stop 19 and this is true if the rewind holding mechanism is omitted which may be done without affecting the operation of the device as a retriever and slack rope tender. When the holding mechanism is employed the end 44 of the lever 43 is interposed between the dog 15 and stop 19 and it is only necessary to shorten the lug 19 or move it away from the lug 18 an additional distance equal to the width of lever 43.

Just prior to the engagement of the inner end 44 of the lever 43 with the lug 19, the dog 15 will have moved the lever 43 about the pivot 46 and the dog 39 will thereby be raised out of engagement with the teeth 38 thus disengaging the holding mechanism with respect to the drum or reel 26. This release, it will be apparent, is made automatically at the end of the rope-unwinding operation and not until the device has been placed in condition for normal operation or coincident therewith.

Figure 4:
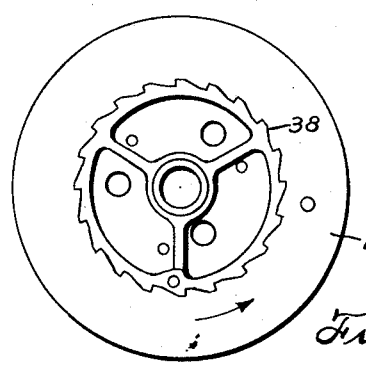
Fig. 4 is a front face view of the rope reel.
Figure 5:
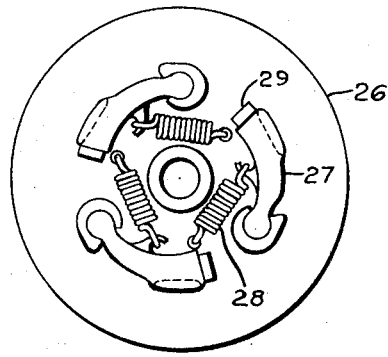
Fig. 5 is a rear face view of the rope reel.

It will be apparent that if the device is on a car and normally operating and for any reason the operator wishes to prevent the spring 34 from taking up slack in the rope he can do so by merely moving the end 45 of the lever 43 throwing the dog 39 into engagement with the teeth 38 as the spring 34 tends to rotate the drum in a rope-winding direction as shown by the arrow on Fig. 4. It will be apparent that under such condition if there is sufficient slack in the rope and the current collector should leave the wire that the tendency would be to rotate the reel in the direction shown by the arrow in Fig. 3 thus throwing the dogs 27 into operation and the spring 6 would tend to rotate the reel in a rope-winding direction but the engagement of the dog 39 with the teeth 38 will prevent such rope-winding operation. The holding mechanism may be thrown out of operative relation manually or automatically but thrown into operative relation manually only.

Modifications of my invention herein disclosed will be apparent to those skilled in the art and I wish to be limited only by my claims.

I claim:—

1. In a trolley retriever, the combination of a casing, a rotary spring-actuated rope drum, a retriever disc having a scroll, a spring mechanism tending to rotate said retriever disc in a rope-winding direction, means for rotating said disc in the rope-unwinding direction and against the tension of said spring mechanism to reset the same, a lever controlled by said scroll, a latch for locking said disc against rotation in the direction urged by said spring mechanism and controlled by said lever for setting said latch, means dependent upon the speed of rotation of the drum for actuating said latch to release the retriever disc, means on the drum engaged by means on the casing to prevent the rotation of the drum in a rope-winding direction while resetting the spring mechanism and means on the disc to engage means associated with the said means on the casing to automatically disengage the said means on the casing from the means on the drum when the spring mechanism is fully reset to permit rotation of the drum under action of the spring mechanism.

2. In a trolley retriever, the combination of a retriever disc having a scroll, a spring mechanism tending to rotate said retriever disc in a rope-winding direction, means for rotating said disc in the rope-unwinding direction and against the tension of said spring to reset the spring, a lever controlled by said scroll, a latch for locking said disc against rotation in the direction urged by said spring mechanism and controlled by said lever for setting said latch, a drum around which the trolley rope is wound, means responsive to the rotative movements of said drum for actuating said latch to interlock the retriever disc and the drum, a second latch controlled by said lever for setting said latch to prevent rotation of the disc in a rope-unwinding direction when the spring is fully reset and holding mechanism arranged to retain the spring mechanism at intervals while being reset.

3. In a trolley retriever, the combination of a retriever disc having a scroll, a spring mechanism tending to rotate said retriever disc in a rope-winding direction, means for rotating said disc in the rope-unwinding direction and against the tension of said spring to reset the spring, a lever controlled by said scroll, a latch for locking said disc against rotation in the direction urged by said spring mechanism and controlled by said lever for setting said latch, a drum around which the trolley rope is wound, means responsive to the rotative movements of said drum for actuating said latch to interlock the retriever disc and the drum, a second latch controlled by said lever for setting said latch to prevent rotation of the disc in a rope-unwinding direction when the spring is fully reset, holding mechanism arranged to retain the spring mechanism at intervals while being reset and means associated with said second lever and the said holding mechanism to automatically render said holding mechanism inoperative when the spring mechanism has been fully reset.

4. In a trolley retriever, the combination of a retriever disc having a scroll, a spring mechanism tending to rotate said retriever disc in a rope-winding direction, means for rotating said disc in the rope-unwinding direction and against the tension of said spring to reset the spring, a lever controlled by said scroll, a latch for locking said disc against rotation of the disc in a rope-unwinding direction when the spring is fully reset, holding mechanism arranged to retain the spring mechanism at intervals while being reset and manually operable means associated with said latch and the said holding mechanism to automatically render said holding mechanism inoperative when the spring mechanism has been fully reset.

5. The combination of a casing, a spring-actuated retriever disc constantly tending to rotate in one direction, a lock mechanism carried by said retriever disc, means under the control of said retriever disc and operable upon a predetermined rotation of said disc in the reverse direction for actuating said lock, stops between which said lock mechanism is positioned when actuated for engagement by said lock mechanism to restrain the rotation of the disc in either direction and holding means to restrain the spring-actuated disc against rotation by the spring at intervals between an unwound and fully wound condition of the spring while the spring-actuated disc is being reset.

6. The combination of a trolley tender having a casing, a rotatable drum upon which a rope is wound and unwound, a spring for rotating the drum in a rope-winding direction, means for interlocking the drum and spring to rotate in unison under predetermined conditions, means to hold the spring in a wound or set condition and means to release the said hold when the said interlock takes place, holding means to restrain the rotation of the drum at intervals under action of the spring during the rewinding of the spring and means by which the said holding means may be placed at will of an operator in operative relation to the aforesaid parts to prevent retrieving of the rope when the spring is fully wound and by which the holding means is also automatically placed in an inoperative relation thereto when the spring is fully set.

7. The combination of a trolley tender having a casing, a rope-winding drum and a spring to rotate the drum in a rope-winding direction, a ratchet and pawl connection between the drum and casing to restrain rotation of the drum at intervals in a rope-winding direction when the drum is rotated in a rope-unwinding direction to wind the spring, the pawl being pivotally mounted on the case and the ratchet on the drum and means to automatically throw the ratchet and pawl out of operative relation when the spring is sufficiently wound and means to manually throw the pawl and ratchet into operative relation at any time to prevent rotation of the drum under action of the spring.

8. A casing for a trolley retriever having a rope-winding drum and a spring to rotate the drum in a rope-winding direction, comprising a body member, a pivotally mounted pawl to engage and disengage with a ratchet on the drum, a pivotally mounted lever on the body member and having a connection with the pawl whereby movement of the lever on its pivot will throw the pawl either into or out of operative relation with the ratchet on the drum at will of an operator and a spring means to hold the pawl either in or out of operative relation with the ratchet.

9. A trolley retriver comprising a casing, a power spring having one end fixed, a rope-winding drum rotated by the spring in a rope-winding direction, rotatable means to connect the other end of the spring to the drum under predetermined conditions, lock mechanism carried by one of the rotatable parts, means operated by the rotation of one of the rotatable parts to actuate the lock mechanism, stops between which the lock mechanism is positioned when actuated for engagement by the lock mechanism to restrain the rotation of the rotatable parts in either direction when the spring is fully wound, centrifugally-operated means to interlock the drum to the rotatable means when the drum is rapidly rotated in a rope-unwinding direction and to actuate the latch mechanism to disengage the stops, holding means to be thrown into operative relation with means on one of the rotatable parts to restrain the rotation of the drum at intervals by the spring when unwinding the rope from the drum and means on one of the rotatable parts to engage with the holding means to render the holding means inoperative when the drum has rotated a predetermined number of times in a rope-unwinding direction.

10. In a trolley tender of the class described, the combination therewith of holding means to restrain the spring-actuated rope drum against rotation by the spring at intervals between an unwound and fully wound condition of the spring while the tender is being reset and means acting upon the holding means to automatically render the holding means inoperative at the end of the rewinding operation but permitting the holding means to again become operative at the end of the rewinding of the spring at will of an operator.

11. In a trolley tender of the class described the combination therewith of holding means normally out of operative relation with the rotatable tender parts to restrain the spring-actuated rope drum against rotation by the spring at intervals between an unwound and fully wound condition of the spring while the tender is being reset and manually operable means to place the holding means into operative relation with the rotatable tender parts at will of an operator.

12. In a trolley tender of the class described the combination therewith of holding means normally out of operative relation with the rotatable tender parts to restrain the spring-actuated rope drum against rotation by the spring at intervals between an unwound and fully wound condition of the spring while the tender is being reset and manually operable means to place the holding means into operative relation with the rotatable tender parts while the spring is in either its wound or its unwound condition.

13. A trolley tender comprising in combination a casing, a drum, a retrieving spring, an intermediate member between the drum and spring, a ratchet on the drum, a pawl pivotally mounted on the casing to directly engage the ratchet on the drum and hold the drum against rotation by the spring at intervals during the winding of the spring, means to automatically disengage the pawl from the ratchet on the drum when the spring is fully wound to permit rotation of the drum under action of the spring and means to re-engage the ratchet and pawl after the pawl and ratchet have been automatically released to prevent operation of the drum.

14. The combination of a trolley tender having a rope-winding drum, a power spring to rotate same in a rope-winding direction and a slack take-up spring of a ratchet and a dog holding mechanism, manually thrown into operative relation with each other to restrain the rotation of the drum at a plurality of stages while the power spring is being wound and automatically thrown out of said relation when the spring has been wound to a predetermined amount.

15. The combination of a trolley tender having a rope-winding drum, a spring arranged to be thrown into action to rotate the drum in a rope-winding direction by the rotation of the drum in a rope-unwinding direction and means automatically thrown into action during the rope-winding operation to cause the unwinding of the rope from the drum to rewind the spring, a ratchet and pawl drum-holding mechanism arranged to be manually thrown into and out of cooperative relation at will of an operator while the spring is in either its wound or its unwound stage and automatically thrown out of said cooperative relation when the spring is in its rewound stage, the holding mechanism when in its operating relation acting during the rewinding of the spring to hold the drum against rewinding the rope and operating when the spring is wound to prevent retrieving of the rope.

16. In a trolley pole retriever the combination of a casing, a spring-driven rope winding drum, a spring having one end connected to the casing, an intermediate member connecting the other end of the spring to the drum and latch mechanism to hold the intermediate member against rotation by the spring, centrifugal dogs to interconnect the drum and intermediate member when the pole leaves the trolley wire to cause simultaneous rotation of the drum and intermediate member and to throw the latch mechanism out of its holding position when the spring is fully wound, teeth upon the drum and a pawl mounted on the casing to engage the teeth on the drum to hold the drum against rotation by the spring during the rewinding of the spring.

ERNST A. LARSSON.